US012615250B2

(12) United States Patent
Ganesan et al.

(10) Patent No.: US 12,615,250 B2
(45) Date of Patent: Apr. 28, 2026

(54) WEB BROWSER-BASED SECURE EQUIPMENT ACCESS

(71) Applicant: Cisco Technology, Inc., San Jose, CA (US)

(72) Inventors: Elango Ganesan, Palo Alto, CA (US); Michael Freed, Pleasanton, CA (US); Maged Khalil, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 18/244,452

(22) Filed: Sep. 11, 2023

(65) Prior Publication Data

US 2024/0154954 A1     May 9, 2024

Related U.S. Application Data

(60) Provisional application No. 63/423,302, filed on Nov. 7, 2022.

(51) Int. Cl.
H04L 9/40 (2022.01)

(52) U.S. Cl.
CPC ...... H04L 63/0838 (2013.01); H04L 63/0807 (2013.01); H04L 63/083 (2013.01)

(58) Field of Classification Search
CPC ..... H04L 63/0838; H04L 9/40; H04L 63/083; H04L 63/0807
See application file for complete search history.

(56) References Cited

U.S. PATENT DOCUMENTS

| | | | |
|---|---|---|---|
| 8,255,696 B2 * | 8/2012 | Florencio | G06F 21/46 |
| | | | 705/64 |
| 9,781,087 B2 | 10/2017 | Chen | |
| 9,876,778 B2 | 1/2018 | Smith et al. | |
| 2004/0165544 A1 * | 8/2004 | Cornett | H04L 41/0856 |
| | | | 370/254 |

(Continued)

FOREIGN PATENT DOCUMENTS

| | | | | |
|---|---|---|---|---|
| JP | 2019062277 A * | 4/2019 | | H04Q 9/00 |
| WO | 2014109881 A1 | 7/2014 | | |
| WO | 2017003379 A1 | 1/2017 | | |

OTHER PUBLICATIONS

European Search Report in European Patent Application No. 23204152.5, dated Jan. 3, 2024, 11 Pages.

(Continued)

*Primary Examiner* — Jayesh M Jhaveri
(74) *Attorney, Agent, or Firm* — Lee & Hayes, P.C.

(57) ABSTRACT

In some implementations, a device receives a login request from a web browser executed by a client endpoint in a first network. The device provides a one-time password to the web browser that causes the client endpoint to invoke a local handler process associated with an access service executed by the client endpoint or invoke access by the web browser to a particular uniform resource locator on the device. The device receives a remote connection request from the access service that includes the one-time password to access a target endpoint in a second network. The device configures, based on the remote connection request, a remote access connection between the client endpoint in the first network and the target endpoint in the second network.

20 Claims, 10 Drawing Sheets

(56)                    References Cited

U.S. PATENT DOCUMENTS

| | | | |
|---|---|---|---|
| 2009/0125997 A1 * | 5/2009 | Cook | H04L 63/0853 |
| | | | 726/6 |
| 2015/0264106 A1 * | 9/2015 | Baek | H04L 65/1016 |
| | | | 709/203 |
| 2020/0351264 A1 * | 11/2020 | Pellizzer | G06Q 20/3276 |
| 2022/0353244 A1 | 11/2022 | Kahn et al. | |
| 2022/0360448 A1 * | 11/2022 | Sahni | H04L 63/0846 |
| 2022/0377069 A1 | 11/2022 | Smith | |

OTHER PUBLICATIONS

"Industrial IoT Gateway—What is SiteManager", online: https://www.secomea.com/sitemanager-industrial-iot-gateway/, accessed Aug. 21, 2023, 9 pages.
"Secure Equipment Access", printed Aug. 21, 2023, 5 pages, Cisco Developer.
"Maintain remote connected assets at scale with Secure Equipment Access in IoT Operations Dashboard", Jun. 6, 2023, 4 pages, Cisco Systems, Inc.

* cited by examiner

720

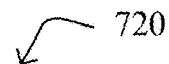

Connected Client Access Method Details

Connected Client Details

Client Name                IP Address/Host Name
mongos                 192.168.1.215

Access Method Details

Access Method              Network PRotocol
SEA Plus               TCP

Description                Port
-                          502

Application Cross Launch URL

-

Application Cross Launch Path

-

Application Cross Launch Advanced Parameters

-

External Equipment Management

If this Access Method will manage other Connected Clients (such as cameras, PLCs, etc.), enable External Equipment Management and select the managed Connected Clients below.

    External Equipment Management

Access Name

Name
modbus (SEA_PLUS)

START

810

RECEIVE LOGIN REQUEST FROM WEB BROWSER

815

PROVIDE OTP

820

RECEIVE REMOTE ACCESS CONNECTION REQUEST

825

CONFIGURE REMOTE ACCESS CONNECTION

830

END

WEB BROWSER-BASED SECURE EQUIPMENT ACCESS

RELATED APPLICATION

This application claims priority to U.S. Provisional Patent Application No. 63/423,302, filed on Nov. 7, 2022, entitled "WEB BROWSER-BASED SECURE EQUIPMENT ACCESS" by Ganesan et al., the contents of which are incorporated by reference herein.

TECHNICAL FIELD

The present disclosure relates generally to computer networks, and, more particularly, to web browser-based secure equipment access.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

As devices are increasingly added to the IoT and IIoT, the number of external users and services that require access to them has also increased. For instance, a remote technician may wish to connect to a particular IoT/IIoT device so that they can perform maintenance on it (e.g., updating its firmware, running diagnostics, etc.). However, the very nature of the IoT/IIoT presents unique challenges that make traditional remote access approaches largely unsuitable. For instance, it is a common occurrence in industrial settings for endpoint devices to share the same Internet Protocol (IP) address, leading to cases in which a remote user needs to access multiple devices simultaneously that share the same IP address. In addition, the level of access actually needed by the remote user may be limited to a specific set of devices, protocol(s), port(s), time period, etc.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7C illustrate examples of a user interface for a remote access system.

DESCRIPTION OF EXAMPLE EMBODIMENTS

Overview

Figure 1:
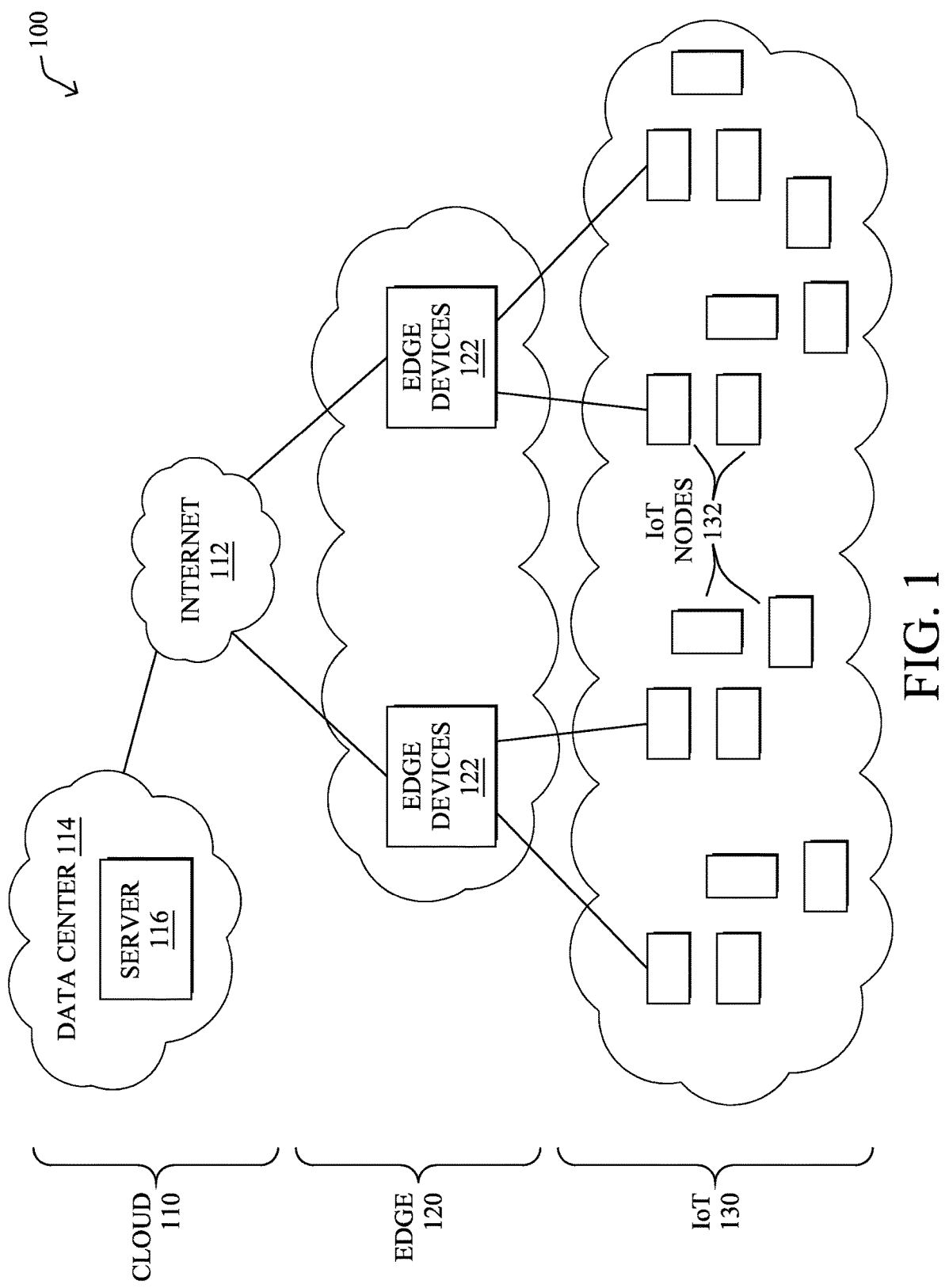
FIG. 1 illustrate an example network.

According to one or more implementations of the disclosure, a device receives a login request from a web browser executed by a client endpoint in a first network. The device provides a one-time password to the web browser that causes the client endpoint to invoke a local handler process associated with an access service executed by the client endpoint or invoke access by the web browser to a particular uniform resource locator on the device. The device receives a remote connection request from the access service that includes the one-time password to access a target endpoint in a second network. The device configures, based on the remote connection request, a remote access connection between the client endpoint in the first network and the target endpoint in the second network.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN)

and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
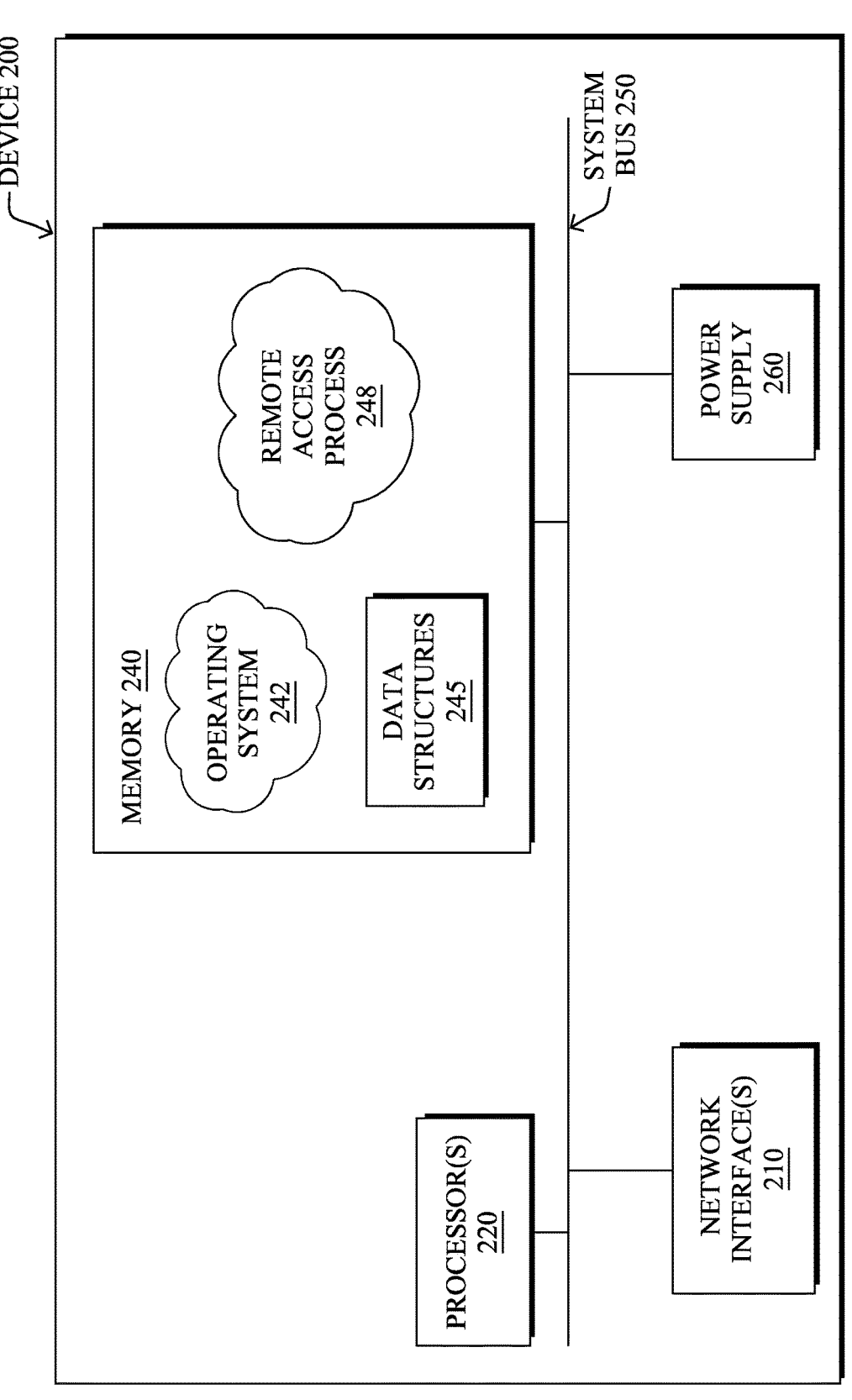
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative remote access process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Many industrial IoT (IIoT)/operations technology (OT) networks are now deployed using a 'cookie-cutter' approach whereby discrete manufacturing or other control segments are deployed using duplicate IP addresses. In other words, the network may comprise a plurality of units, such as cells, zones, bays, etc., with addresses being repeated across units. As a result, different devices may belong to overlapping subnets. In addition, these devices may be located behind one or more firewalls and/or network address translation (NAT) devices.

Figure 3:
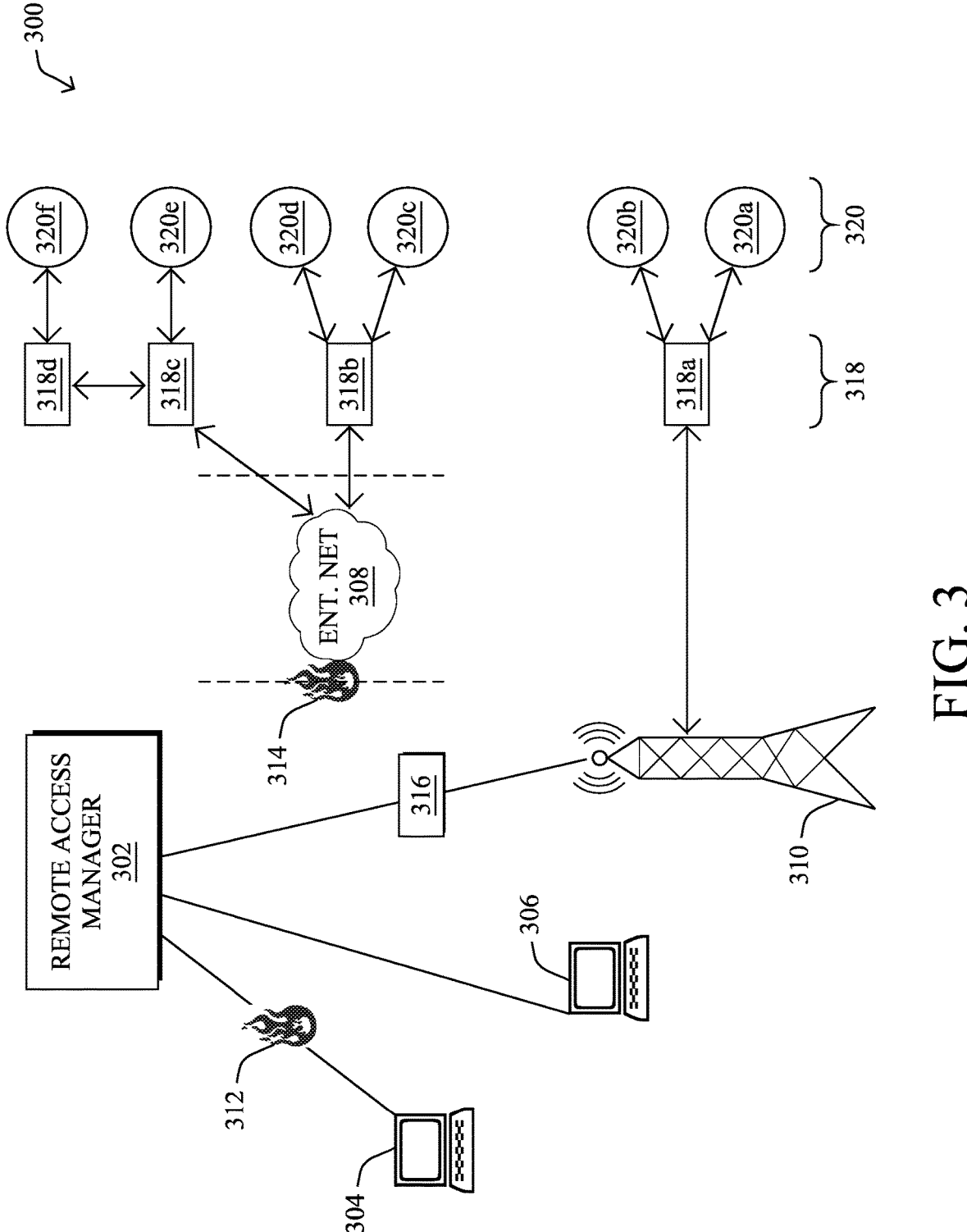
FIG. 3 illustrates an example of a remote access manager configuring remote access to an endpoint in a network.

By way of example, FIG. 3 illustrates an example 300 of a remote access manager 302 (e.g., a device 200) being used to configure remote access to an endpoint device in a network, according to various embodiments. As shown, assume that there are various endpoints 320 (e.g., IIoT devices) that are on a local network of a particular location, such as a factory, warehouse, or the like. In addition, assume that any or all of endpoints 320 each execute their own web application servers, allowing a technician to perform various functions such as reviewing diagnostic information, making configuration changes, and the like.

For instance, endpoints 320a-320b may be behind gateway 318a, which utilizes a cellular connection with a cell tower 310 and is behind NAT 316. Endpoints 320c-320d are behind gateway 318b, which is connected to an enterprise network 308 and behind a firewall 314. Likewise, endpoint 320f is behind gateway 318d. Gateway 318d and endpoint 320e are both behind gateway 318c, which is also connected to enterprise network 308 and behind firewall 314.

Remotely accessing the application web server of a particular endpoint 320 is quite challenging under normal circumstances. For instance, assume that the user of client 304 wishes to access the web server of endpoint 320b. To enable such a connection, a remote access manager 302 may configure the various networking devices between client 304 and endpoint 320b, according to various embodiments. Typically, this is done by configuring backdoor access to the specific endpoint 320 and a virtual private network (VPN) connection between client 304 and that endpoint 320. However, the operational overhead in configuring VPN connections and creating rules to access the different endpoints 320 by the myriad of external/remote clients can be quite cumbersome for network administrators. This burden will only continue to grow as the number of IoT/IIoT devices and manufacturers also increases.

——Web Browser-Based Secure Equipment Access——

The techniques introduced allow for secure, remote access connections to be formed dynamically with endpoints located in one or more remote networks. In some aspects, the architecture herein allows for the automated configuration of remote connections with one or more endpoints at the same time, even if those devices share the same network addresses.

Illustratively, the techniques described herein may be performed by hardware, software, and/or firmware, such as in accordance with remote access process 248, which may include computer executable instructions executed by the processor 220 (or independent processor of interfaces 210) to perform functions relating to the techniques described herein.

Figure 4:
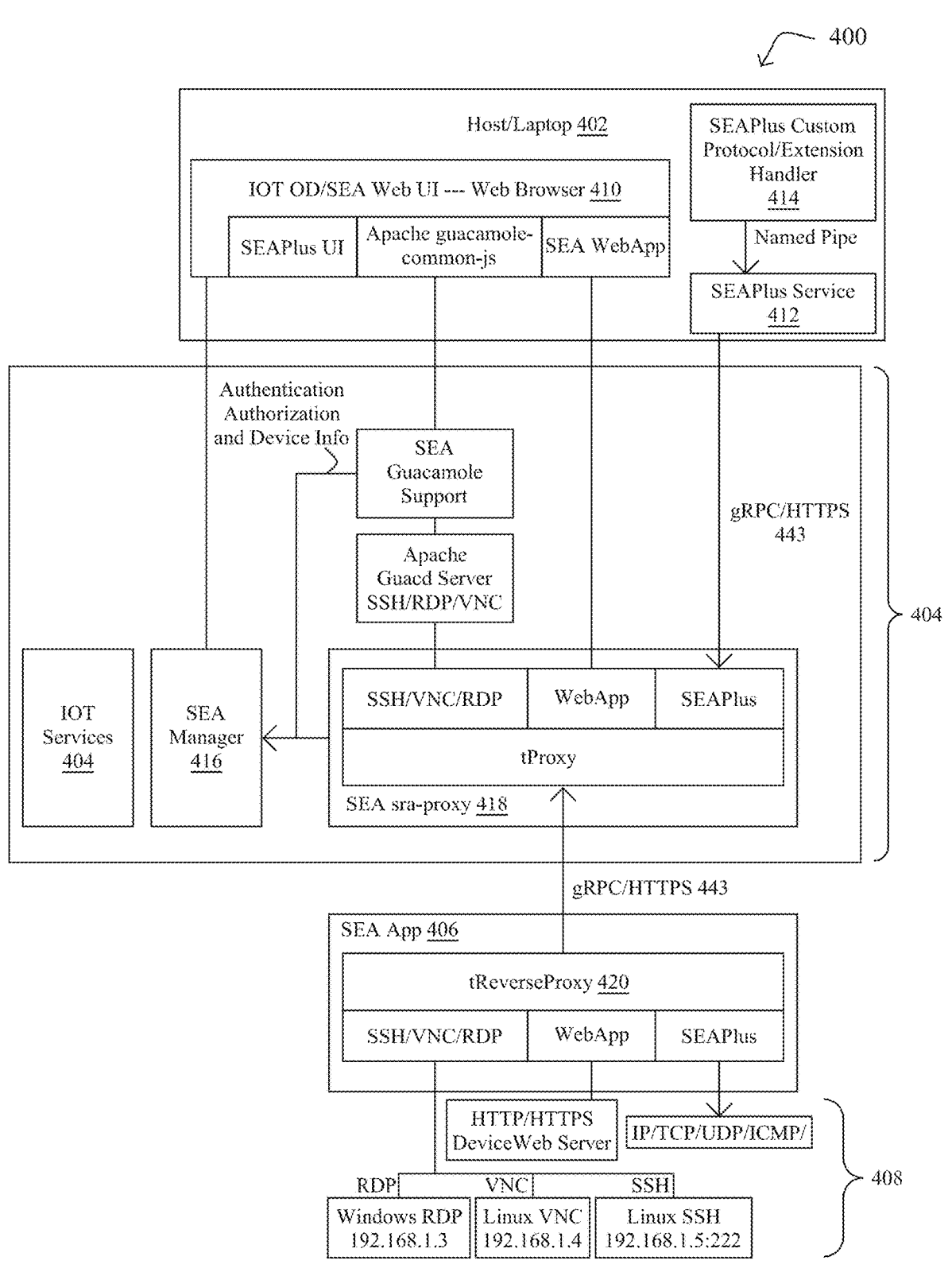
FIG. 4 illustrates an example of remote access to a device using a web application.

Specifically, in various embodiments, a device receives a login request from a web browser executed by a client endpoint in a first network. The device provides a one-time password to the web browser that causes the client endpoint to invoke a local handler process associated with an access service executed by the client endpoint or invoke access by the web browser to a particular uniform resource locator on the device. The device receives a remote connection request from the access service that includes the one-time password to access a target endpoint in a second network. The device configures, based on the remote connection request, a remote access connection between the client endpoint in the first network and the target endpoint in the second network. Operationally, FIG. 4 illustrates an example of remote access to a device using a web application, according to various embodiments. In one specific implementation, different remote access protocols such as Remote Desktop Protocol (RDP), Virtual Network Computing (VNC), and Secure Shell Protocol (SSH) are delivered to the remote host via their web browser. Such protocols work in conjunction with the various networking equipment in the remote network through a set of services to configure a remote connection across remote gateways, routers, network address translation (NAT) boundaries, and the like. To do so, Apache Guacamole can be used, to build a multi-tenant, scalable set of services that provide high availability.

Thus, three layers are implemented in the architecture 400 shown in FIG. 4:

1. Cloud: Here, a remote access cloud service 404 may include a remote access manager/secure equipment access (SEA) manager 416, such as remote access manager 302, may take the form of multi-tenant, highly available, cloud scale tunneling and routing service for any number of gateways and remote clients/hosts over HTTPS/gRPC or the like.

2. Client: In some embodiments, a host 402 (e.g., a laptop, desktop, portable device, etc.) may execute a client application/SEAPlus service 412 in conjunction with a local web browser 410 that supports any number of client operating systems, such as Windows, Mac, Linux, etc. For instance, the client application may be written in a language such as Golang or the like. As described further below, this allows local web browser 410 to load a user interface (UI) via the Internet to access remote access cloud service 404. When host 402 is to initiate a remote session with any of target endpoints 408 in the remote network, the SEAPlus service 412 local to host 402 may interact with custom protocols/extension handler 414 on host 402.

3. Gateway Secure Equipment Access (SEA) App: As shown, an SEA application (app) 406 may also be executed on the gateway, router, or other networking device of the network in which the target endpoint is located. In various embodiments, SEA app 406 may be responsible for acting as a transparent Layer 3 (L3) and/or Layer 4 (L4) proxy, as well as bridging IP over HTTPS/gRPC tunnels to remote clients.

More specifically, in various embodiments, architecture 400 may have any or all of the following features:

An application 406 (e.g., an IOx app in the case of a Cisco device) for execution by the networking equipment (e.g., the gateway of the local network) that combines a dynamically configurable firewall with a L4 TCP proxy working over gRPC.

A cloud scale proxy service 418 to front end any number of gateways and route to a backend service, such as Apache Guacamole or the like.

A secure and scalable, multi-tenant, HTTP reverse proxy 420 for remote and embedded webservers on operations technology (OT) equipment (e.g., IIoT devices).

Support for OT devices with private IP addresses.

Support for OT devices with overlapping IP addresses, without confusing the browser cookies.

Real IP addresses from the client browser.

Support for dual login modes involving an outer login to the remote access manager 302 and the respective inner login, without confusing browser authentication methods.

The use of end-to-end Transport Layer Security (TLS) support for non-secure, HTTP-only embedded servers.

A simplified user interface for nontechnical OT remote access user

IP-based remote access enabled directly from the web browser of the host/client (e.g., a laptop or other remote device) without having to explicitly launch client programs/logins.

Remote access that does not require administrator privileges

Multifactor Authentication (MFA) support and posture checks (e.g., using Duo or another MFA mechanism)

Support for Network Address Translation (NAT) on both sides

Automatic configuration of remote connections without having to request manual firewall reconfiguration to open it for various IP protocols and UDP ports Fine grained access control, meaning that the entire local network where the target endpoint(s) are located is not opened up to the remote access user (e.g., by limiting a remote user to a specific set of endpoint device(s), protocol(s), port(s), time window(s), etc.)

Figure 5:
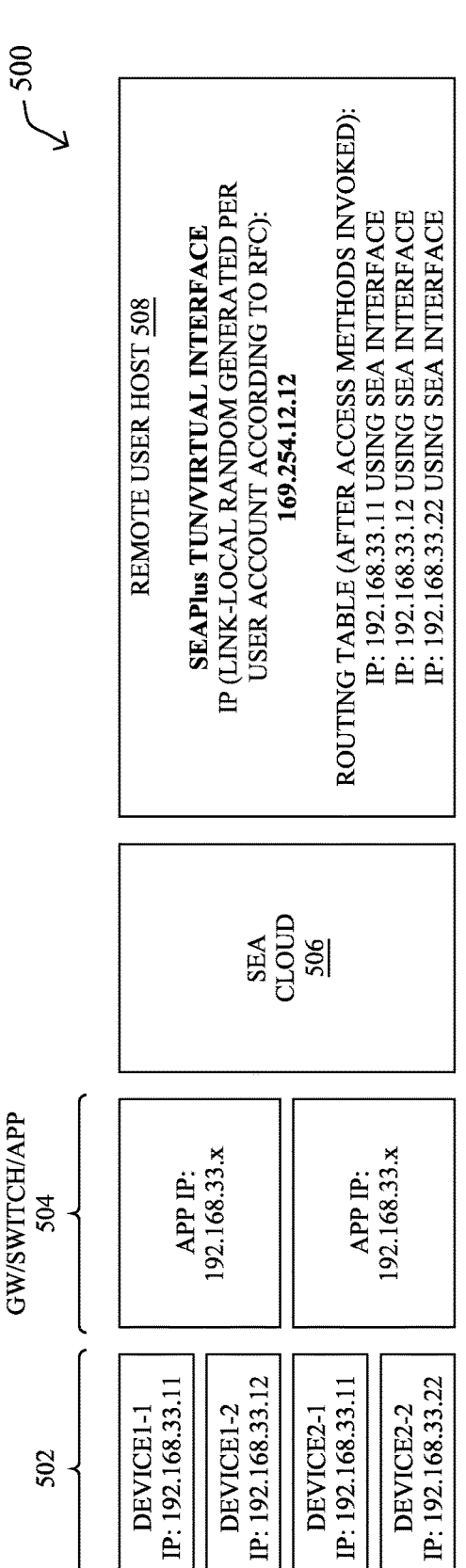
FIG. 5 illustrates an example of address translation using the techniques herein.

Support for OT devices with private IP addresses and/or overlapping IP addresses Support for simultaneous access to multiple OT devices (e.g., an of endpoints 408) on different private networks, across various remote sites/gateways, with fine grained access controls The ability for multiple users to access the same equipment By way of example, consider the case shown in diagram 500 in FIG. 5 in which a remote user host 508 leverages architecture 400 to access a plurality of endpoint devices 502 in a local network or set of local networks (e.g., a local network that is remote from that of remote user host 508), some of which may have the same IP address. Such a scenarios is fairly common in an OT/IIoT environment, as industrial devices are often deployed with overlapping IP addresses (e.g., across different subnets, factories/local networks, etc.).

As shown, assume that the remote user host 508 wishes to connect to a number of endpoint devices 502: device 1-1, device 1-2, device 2-1, and device 2-2 (e.g., two sets of endpoints located across two different local networks). Each of the two local networks may have corresponding networking equipment 504, such as corresponding gateway (GW), router, switch, or other networking equipment configured to execute the SEA app shown in architecture 400.

Here, device 1-1 and device 2-1 may share the same IP address of 192.168.33.1 in their respective networks. According to various embodiments, from the standpoint of remote user host 508, a custom "SEA-Plus" TUN/virtual interface (e.g., in the case of the host being a Windows device) may generate a random link-local address of 169.254.12.12, according to the user account of the user with the remote access system. After configuring the remote connections, remote user host 508 may also maintain the following addresses in its routing table:

IP: 192.168.33.11 using the above interface
IP: 192.168.33.12 using the above interface
IP: 192.168.33.13 using the above interface From the standpoint of applications running on each networking device in networking equipment 504, they may each perform a NAT function such that the address of the application (e.g., of the form '192.168.33.x') is exposed to the endpoint devices, rather than the 169.254.12.12 address of the remote host. In this manner, the system can not only allow for the simultaneous access to endpoints that are located at different remote sites, but also automatically configure the networking equipment 504 at both sites. In other words, the applications executed by the respective gateways or other networking equipment at both sites are able to handle the address translations needed for purposes of forming the multiple remote connections. For instance, say a remote engineer wishes to review the configurations of four pieces of equipment simultaneously, to ensure that each has the same configuration. The system introduced herein would allow for the engineer to do so by remotely accessing all four devices, despite the fact that they are located at different locations and some share the same internal address.

To be able tunnel network messages from the remote host, the SEA plus service (e.g., SEAPlus service 412 in FIG. 4) on remote user host 508 needs to be able to securely connect to the backend cloud 506 (e.g., the remote access manager 302 and/or remote access cloud service 404 shown in FIGS. 3-4, respectively). In addition, any or all of the following should also be met, preferably:

a.) The SEAPlus service on remote user host 508 may only establish a connection with the backend when the user requests it, for security reasons. Note that existing solutions require credentials/tokens to be saved at the time of installation of the agent, which is not secure, as this information could be exfiltrated by malware or a hacker.

b.) On Windows hosts, the SEA Plus service may be run as a Windows service, but in a manner that is transparent to the user (e.g., without requiring the user to input credentials, interactively)

c.) If a user is already logged into the backend SEA cloud 506 using the browser-based user interface (UI), there should be no need for that user to have to reperform the authentication, authorization, MFA, etc. steps.

Figure 6:
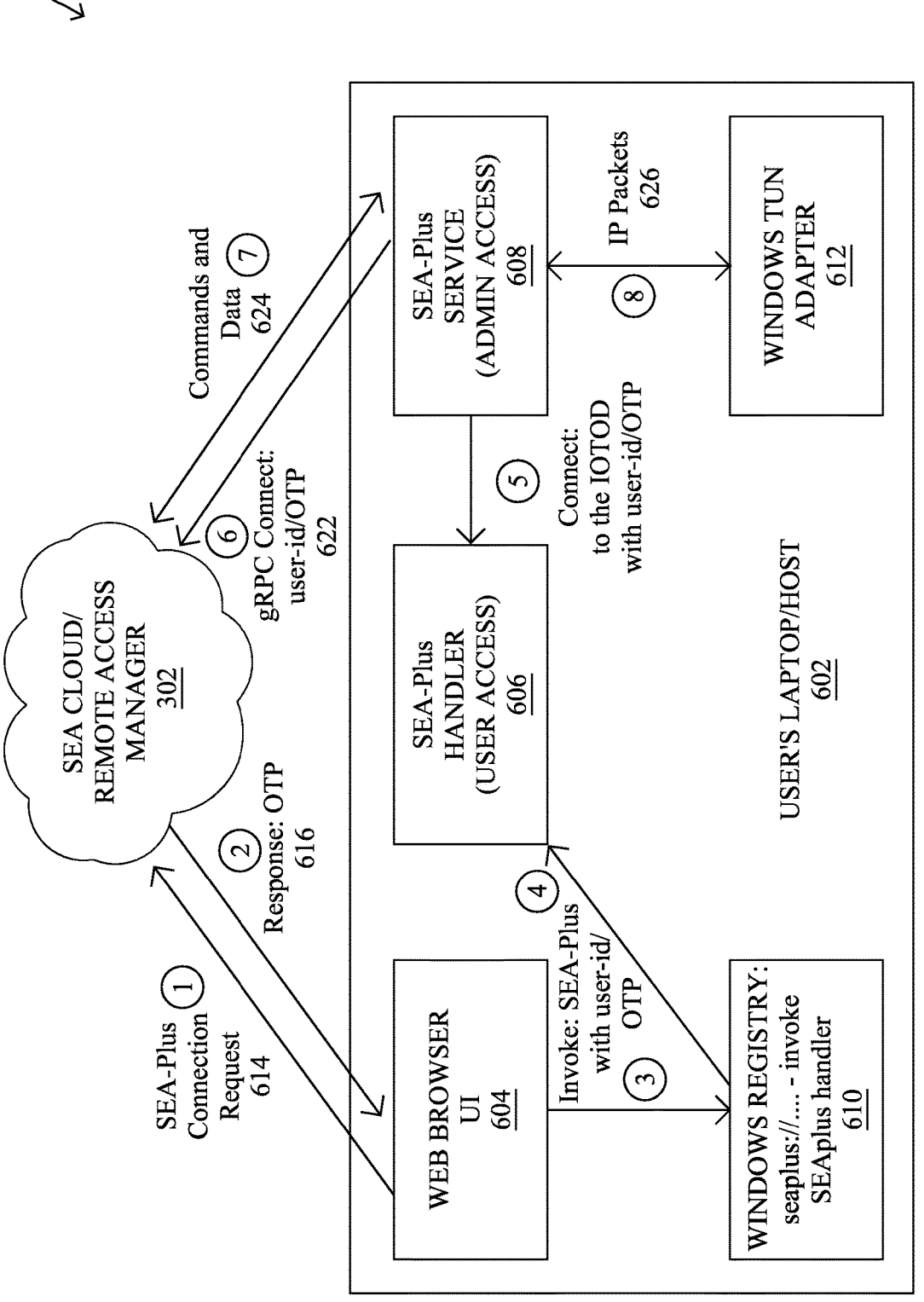
FIG. 6 illustrates an example diagram showing the establishment of a new remote session.

In various embodiments, the techniques herein may entail the performance of the steps shown in example diagram 600 in FIG. 6 using architecture 400. First, at installation time, the user may operate host 602 to log into the SEA cloud service/remote access manager 302 (e.g., by providing their username, password, MFA info., etc.). In response, the backend may generate a random secret and save it on both host 602 and in the cloud. To then initiate a remote connection, the following steps may be performed, in various embodiments:

Step 1: The user may log into the web browser-based UI 604 of the SEA cloud/remote access manager 302 via the local web browser of host 602 (e.g., by performing authentication, authorization, MFA., etc.) and sends a remote connection request 614 to an endpoint located at a remote site.

Step 2: In turn, the SEA cloud/remote access manager 302 may generate a random and short-lived (e.g., 30 seconds or less) client/user ID and one-time password/secret (OTP) and provide this info back to browser-based UI 604 as part of response 616.

Step 3: The SEA Plus handler 606 is then invoked from the registry 610 of host 602. Alternatively, response 616 may cause the web browser to invoke web browser-based access to a special/custom uniform resource locator (URL) on the device.

Step 4: The web browser of host 602 then passes the ID and OTP to the invoked handler 606.

Step 5: The handler 606 uses the ID and OTP to connect to connect to the local SEA service 608, which initiates the session and uses the installation secret to generate a time-based OTP and combines it with the ID/OTP from browser-based UI 604.

Step 6: local SEA service 608 then sends the credentials to remote access manager 302 for validation via message 622. If the credentials are valid and a session already exists with the same user, remote access manager 302 may then do any or all of the following: 1.) stop/abort the current session, 2.) reject the new request, and/or 3.) notify the user about multiple connection attempts reusing the same valid credentials.

Step 7: Assuming that the backend is able to validate the supplied credentials, it may then pass any command or data 624 back to host 602, as well as configure the networking device(s) in the same local network as the target endpoint for the remote session, accordingly.

Step 8: Host 602 can then send IP packets via the remote connection, such as by using its TUN adapter 612, if host 602 is a Windows device.

As would be appreciated, using the approach described above will make the remote access very secure. More specifically, to be able to circumvent this approach, a malicious entity would need to mount simultaneous man-in-the-middle (MIM) attacks on browser-local service communications, as well as gain access to the secret/key store of the host device, all within a very short period of time (e.g., on the order of seconds).

To be able tunnel network messages from the remote host, the SEA Plus service on the host needs to be able to "catch" packets which are destined to the IoT device, to be forwarded to the cloud using the tunnel and from the cloud to the gateway. To do so, the system my perform the following:

a.) After enabling the SEA service, a Virtual Interface is created on the host and assigned a pseudo-random link-local IP address(novel) for that interface. Note that the IP address generated by SEA Plus service may be based on the random client ID generated by the cloud/backend service/remote access manager 302, which allows it to perform additional validation.

b.) The authenticated/authorized user initiates session via the UI, which issues request to backend request to allow access to the device with specific IP/protocol/ports behind specific GW from that SEA Plus client with this link-local IP.

c.) The backend sends the request to both the SEA app of the gateway or other networking device and to the SEA Plus service. Note that this dynamic configuration for both the gateway agent and the SEA Plus service by the cloud/backend also helps to prevent malicious entities from issuing commands and/or configuring those agents, directly.

d.) The SEA Plus service will add a route to the target device though it's Virtual Interface/link-local IP.

e.) The app of the networking equipment (on the gateway/switch) will then enable source NAT Masquerade. This will replace the IP address of the user host/laptop with the IP of the networking device and "fool" the endpoint OT/IIoT device to think that request is local, so that routing will work correctly.

Figure 7A:
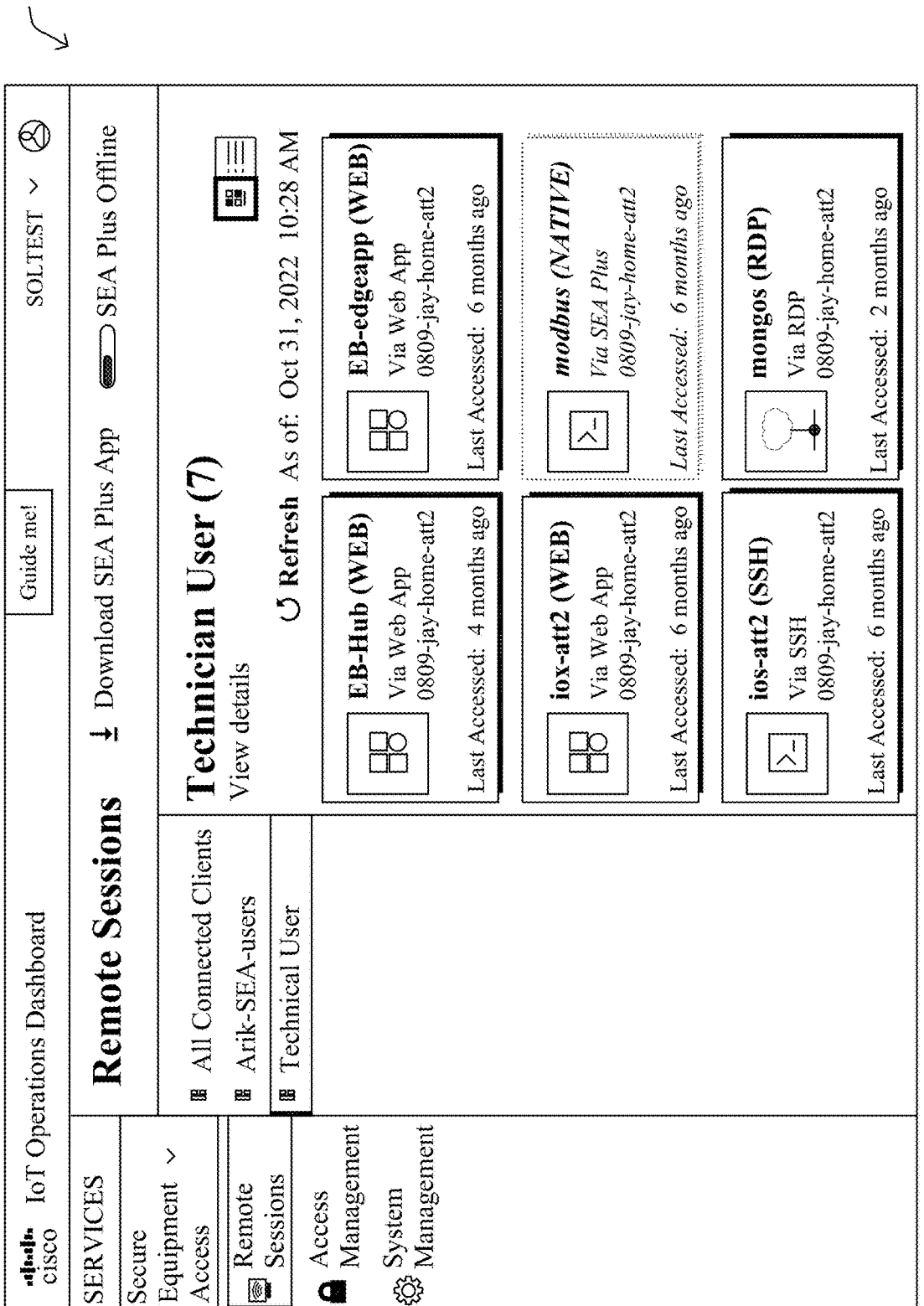
Figure 7B:
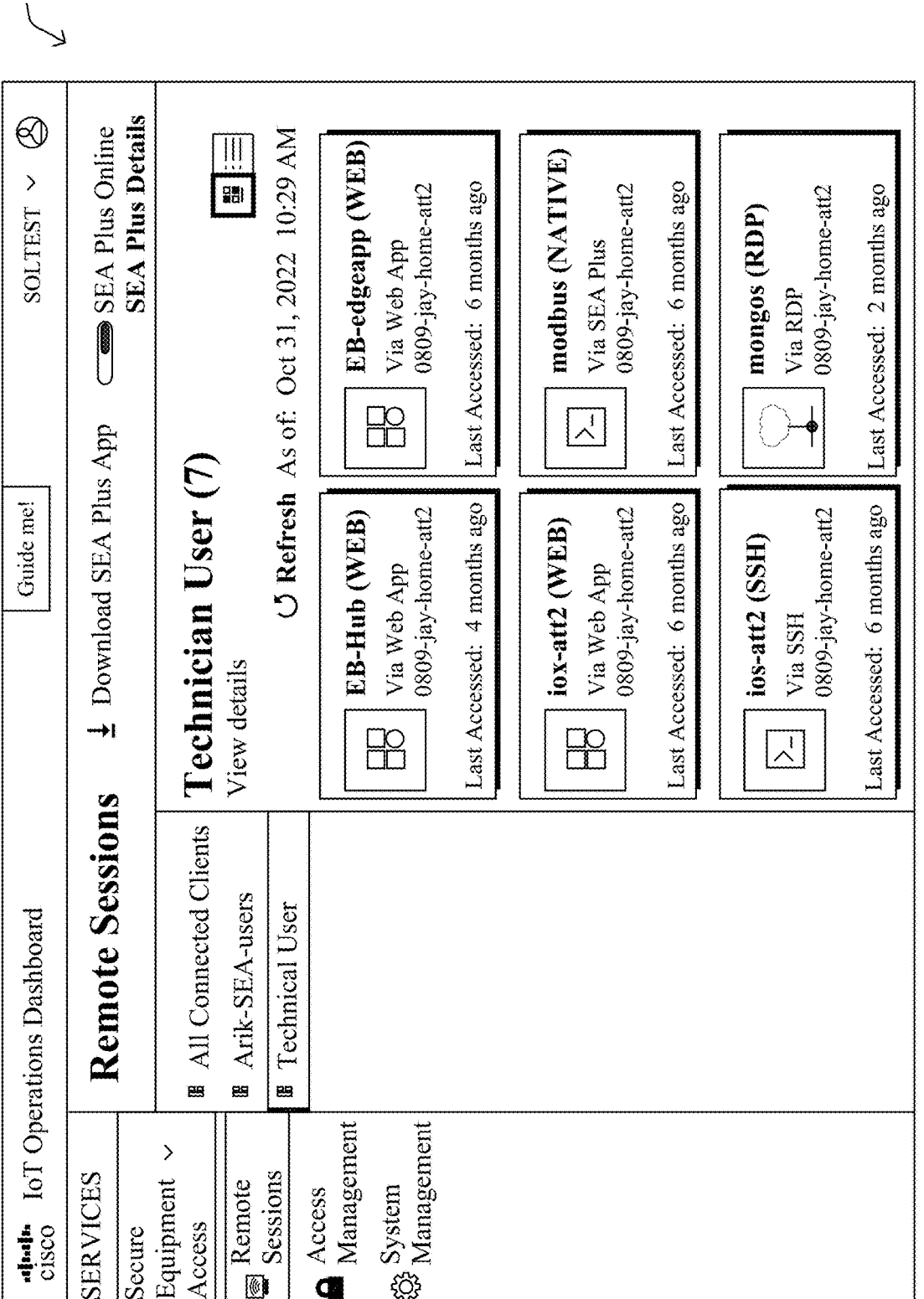

FIGS. 7A-7C illustrate examples of a user interface for a remote access system, such as the web browser-based UI shown in FIGS. 4 and 6. As shown, a particular user (e.g., a technician user) may be able to use the system introduced herein to connect to a plurality of different endpoints across different sites/local networks, remotely, using their web browser and across any number of different protocols.

Figure 8:
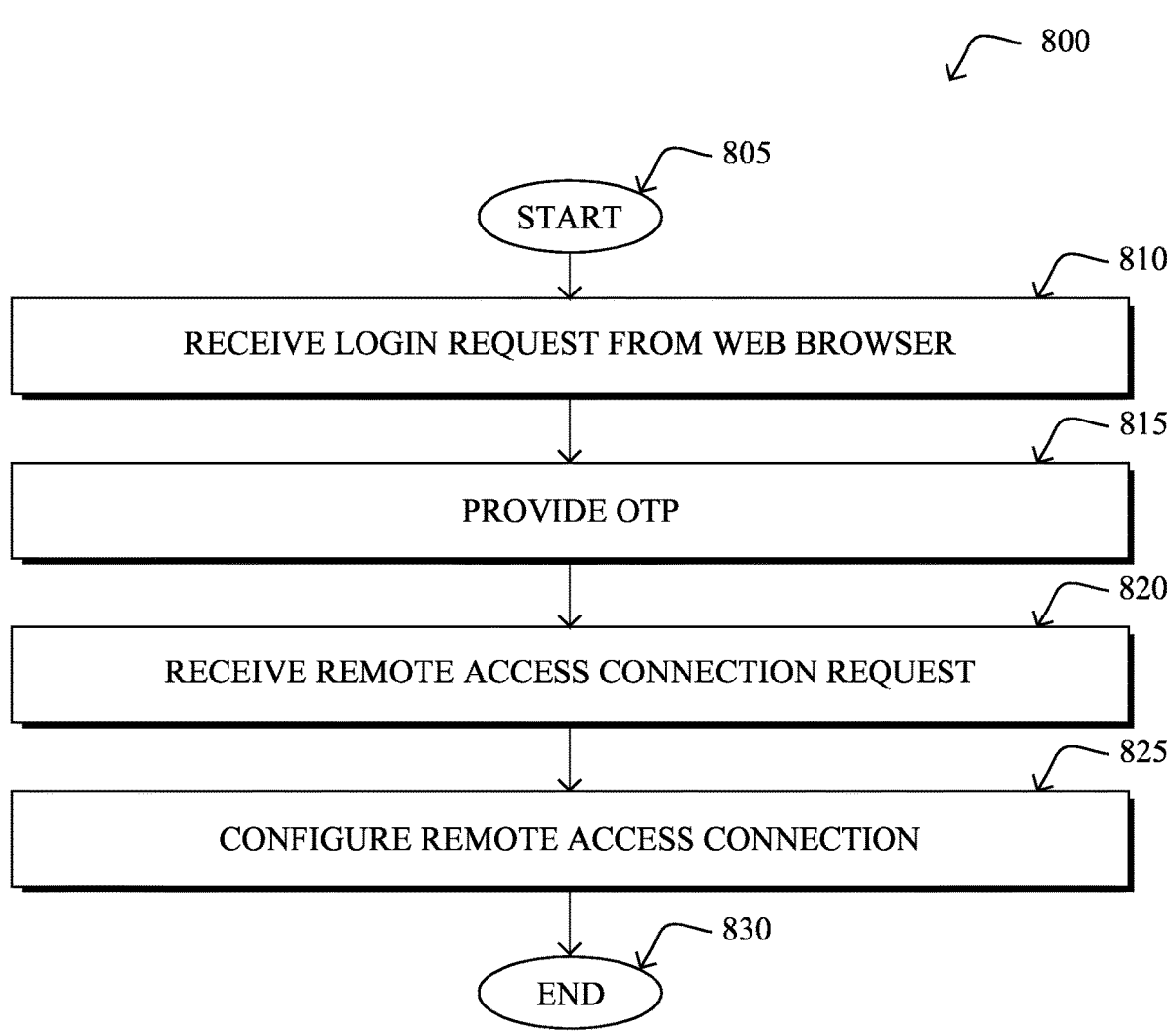
FIG. 8 illustrates an example simplified procedure for web browser-based secure equipment access.

FIG. 8 illustrates an example simplified procedure 800 (e.g., a method) for web browser-based secure equipment access, in accordance with one or more embodiments described herein. For example, a non-generic, specifically configured device (e.g., device 200) may perform procedure 800 by executing stored instructions (e.g., application experience optimization process 248). The procedure 800 may start at step 805, and continues to step 810, where, as described in greater detail above, the device may receive a login request from a web browser executed by a client endpoint in a first network. In some instances, the device is part of a cloud-hosted remote access service external to the first network and the second network. In various implementations, the second network is an industrial network and the target endpoint comprises a sensor or actuator. In addition, the device may also provide a user interface to the web browser that allows a user of the client endpoint to select from among a set of target endpoints to which the user is authorized to access remotely.

At step 815, as detailed above, the device may provide a one-time password to the web browser that causes the client endpoint to invoke a local handler process associated with an access service executed by the client endpoint or invoke access by the web browser to a particular uniform resource locator on the device. In some implementations, the device may provide a temporary identifier in conjunction with the one-time password, wherein the remote connection request includes the temporary identifier. In various implementations, the device associates the one-time password with the target endpoint, based on an authentication of the login request. In some instances, the client endpoint executes the local handler process and the access service transparently to a user of the client endpoint.

At step 820, the device may receive a remote connection request from the access service that includes the one-time password to access a target endpoint in a second network, as described in greater detail above. In turn, the device may verify that the one-time password matches that sent to the endpoint client in step 815.

At step 825, as detailed above, the device may configure, based on the remote connection request, a remote access connection between the client endpoint in the first network and the target endpoint in the second network. In some implementations, the device may do so by establishing a tunnel between the client endpoint and the target endpoint. In further implementations, the device may do so by configuring a networking device in the second network to perform network address translation for the target endpoint. In various cases, the device may configure at least one networking device in the second network to issue a request to the target endpoint, such as an IP-based request.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the remote access of IoT devices in a secure manner, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
receiving, at a device, a login request from a web browser executed by a client endpoint in a first network;
providing, by the device, a one-time password generated by the device to the web browser that causes the client endpoint to invoke a local handler process associated with an access service executed by the client endpoint or to invoke access by the web browser to a particular uniform resource locator on the client endpoint;
receiving, at the device, a remote connection request from the access service that includes the one-time password associated with a target endpoint to access the target endpoint in a second network; and
configuring, by the device and based on the remote connection request, a remote access connection between the client endpoint in the first network and the target endpoint in the second network.

2. The method as in claim 1, wherein configuring the remote access connection comprises:
establishing a tunnel between the client endpoint and the target endpoint.

3. The method as in claim 1, wherein configuring the remote access connection comprises:
configuring a networking device in the second network to perform network address translation for the target endpoint.

4. The method as in claim 1, further comprising:
providing, by the device, a temporary identifier in conjunction with the one-time password, wherein the remote connection request includes the temporary identifier.

5. The method as in claim 1, further comprising:
associating, by the device, the one-time password with the target endpoint, based on an authentication of the login request.

6. The method as in claim 1, wherein the device is part of a cloud-hosted remote access service external to the first network and the second network.

7. The method as in claim 1, wherein configuring the remote access connection comprises:
configuring at least one networking device in the second network to issue a request to the target endpoint.

8. The method as in claim 1, wherein the second network is an industrial network and the target endpoint comprises a sensor or actuator.

9. The method as in claim 1, further comprising:
providing, by the device, a user interface to the web browser that allows a user of the client endpoint to select from among a set of target endpoints to which the user is authorized to access remotely.

10. The method as in claim 1, wherein the client endpoint executes the local handler process and the access service transparently to a user of the client endpoint.

11. An apparatus, comprising:
one or more network interfaces;
a processor coupled to the one or more network interfaces and configured to execute one or more processes; and a memory configured to store a process that is executable by the processor, the process when executed configured to:

receive a login request from a web browser executed by a client endpoint in a first network;

provide a one-time password generated by the apparatus to the web browser that causes the client endpoint to invoke a local handler process associated with an access service executed by the client endpoint or to invoke access by the web browser to a particular uniform resource locator on the client endpoint;

receive a remote connection request from the access service that includes the one-time password associated with a target endpoint to access the target endpoint in a second network; and configure, based on the remote connection request, a remote access connection between the client endpoint in the first network and the target endpoint in the second network.

12. The apparatus as in claim 11, wherein the apparatus configures the remote access connection by:

establishing a tunnel between the client endpoint and the target endpoint.

13. The apparatus as in claim 11, wherein the apparatus configures the remote access connection by:

configuring a networking device in the second network to perform network address translation for the target endpoint.

14. The apparatus as in claim 11, wherein the process when executed is further configured to:

provide a temporary identifier in conjunction with the one-time password, wherein the remote connection request includes the temporary identifier.

15. The apparatus as in claim 11, wherein the process when executed is further configured to:

associate the one-time password with the target endpoint, based on an authentication of the login request.

16. The apparatus as in claim 11, wherein the apparatus is part of a cloud-hosted remote access service external to the first network and the second network.

17. The apparatus as in claim 11, wherein the apparatus configures the remote access connection by:

configuring at least one networking device in the second network to issue a request to the target endpoint.

18. The apparatus as in claim 11, wherein the second network is an industrial network and the target endpoint comprises a sensor or actuator.

19. The apparatus as in claim 11, wherein the process when executed is further configured to:

provide a user interface to the web browser that allows a user of the client endpoint to select from among a set of target endpoints to which the user is authorized to access remotely.

20. A tangible, non-transitory, computer-readable medium storing program instructions that cause a device to execute a process comprising:

receiving, at the device, a login request from a web browser executed by a client endpoint in a first network;

providing, by the device, a one-time password generated by the device to the web browser that causes the client endpoint to invoke a local handler process associated with an access service executed by the client endpoint or to invoke access by the web browser to a particular uniform resource locator on the client endpoint;

receiving, at the device, a remote connection request from the access service that includes the one-time password associated with a target endpoint to access the target endpoint in a second network; and configuring, by the device and based on the remote connection request, a remote access connection between the client endpoint in the first network and the target endpoint in the second network.

\* \* \* \* \*